United States Patent
Noatschk et al.

(10) Patent No.: US 10,329,450 B2
(45) Date of Patent: Jun. 25, 2019

(54) METHOD FOR PRODUCING A MULTICOAT COATING

(71) Applicant: BASF Coatings GmbH, Muenster (DE)

(72) Inventors: Jens-Henning Noatschk, Muenster (DE); Jan-Bernd Kues, Muenster (DE); Alberto Garcia Martin, Valencia (ES); Eva-Kathrin Schillinger, Muenster (DE); Dirk Riediger, Drensteinfurt (DE)

(73) Assignee: BASF Coatings GmbH, Münster (DE)

( * ) Notice: Subject to any disclaimer, the term of this patent is extended or adjusted under 35 U.S.C. 154(b) by 0 days.

(21) Appl. No.: 15/575,478

(22) PCT Filed: Apr. 4, 2016

(86) PCT No.: PCT/EP2016/057328
§ 371 (c)(1),
(2) Date: Nov. 20, 2017

(87) PCT Pub. No.: WO2016/188656
PCT Pub. Date: Dec. 1, 2016

(65) Prior Publication Data
US 2018/0187044 A1   Jul. 5, 2018

(30) Foreign Application Priority Data

May 22, 2015 (EP) .................................. 15168855

(51) Int. Cl.
| | | |
|---|---|---|
| *B05D 3/02* | (2006.01) | |
| *B05D 7/00* | (2006.01) | |
| *B05D 7/02* | (2006.01) | |
| *C08J 9/36* | (2006.01) | |
| *C09D 5/00* | (2006.01) | |
| *C08G 18/08* | (2006.01) | |
| *C08G 18/28* | (2006.01) | |
| *C08G 18/42* | (2006.01) | |
| *C08G 18/70* | (2006.01) | |
| *C08G 18/73* | (2006.01) | |
| *C08G 18/79* | (2006.01) | |
| *C09D 17/00* | (2006.01) | |
| *C08G 101/00* | (2006.01) | |
| *C09D 175/04* | (2006.01) | |
| *C09D 175/06* | (2006.01) | |

(52) U.S. Cl.
CPC ......... *C09D 175/06* (2013.01); *B05D 3/0272* (2013.01); *B05D 7/02* (2013.01); *B05D 7/52* (2013.01); *B05D 7/532* (2013.01); *B05D 7/534* (2013.01); *B05D 7/536* (2013.01); *C08G 18/0804* (2013.01); *C08G 18/0819* (2013.01); *C08G 18/283* (2013.01); *C08G 18/4233* (2013.01); *C08G 18/706* (2013.01); *C08G 18/73* (2013.01); *C08G 18/792* (2013.01); *C08J 9/365* (2013.01); *C09D 5/002* (2013.01); *C09D 17/002* (2013.01); *C09D 175/04* (2013.01); *B05D 2201/02* (2013.01); *B05D 2503/00* (2013.01); *C08G 2101/0008* (2013.01); *C08G 2410/00* (2013.01); *C08J 2205/06* (2013.01); *C08J 2375/04* (2013.01); *C08J 2475/04* (2013.01); *C08J 2475/06* (2013.01)

(58) Field of Classification Search
CPC . B05D 7/52; B05D 7/53; B05D 7/532; B05D 7/534; B05D 7/536; B05D 2201/02; B05D 2503/00
USPC .......................................... 427/407.1, 412.1
See application file for complete search history.

(56) References Cited

U.S. PATENT DOCUMENTS

| | | | |
|---|---|---|---|
| 5,331,039 A | 7/1994 | Blum et al. | |
| 2006/0141234 A1 | 6/2006 | Rearick et al. | |
| 2013/0089731 A1 | 4/2013 | Imanaka et al. | |
| 2014/0050928 A1* | 2/2014 | Gebauer ................. | B05D 7/53 |
| | | | 428/446 |

FOREIGN PATENT DOCUMENTS

| | | |
|---|---|---|
| DE | 199 30 665 A1 | 1/2001 |
| EP | 0 542 105 A1 | 5/1993 |
| RU | 2 192 441 C2 | 11/2002 |
| RU | 2 317 358 C2 | 2/2008 |
| RU | 2 473 570 C2 | 1/2013 |
| RU | 2 482 135 C2 | 5/2013 |
| WO | 97/45475 A1 | 12/1997 |
| WO | 2007/082838 A1 | 7/2007 |
| WO | 2008/113755 A1 | 9/2008 |
| WO | 2008/125250 A1 | 10/2008 |
| WO | 2009/101133 A1 | 8/2009 |
| WO | 2013/153190 A1 | 10/2013 |

OTHER PUBLICATIONS

International Search Report dated May 25, 2016 in PCT/EP2016/057328 filed Apr. 4, 2016.
Extended European Search Report dated Nov. 11, 2015 in Patent Application No. 15168855.3, (with English translation of categories of cited documents) 7 pages.
Written Opinion of the International Searching Authority (with English translation) and International Search Report (English translation previously filed) dated May 25, 2016 in PCT/EP2016/057328 filed Apr. 4, 2016, 18 pages.

* cited by examiner

*Primary Examiner* — William P Fletcher, III
(74) *Attorney, Agent, or Firm* — Oblon, McClelland, Maier & Neustadt, L.L.P.

(57) ABSTRACT

A method for producing a multicoat coating (M) on a substrate (S) that includes:(!) producing a basecoat (B) on the substrate by applying an aqueous basecoat material (b) to the substrate (S), the basecoat material being a two-component coating composition, and (II) producing a clearcoat (K) directly on the basecoat (B) by applying an aqueous clearcoat material (k) directly to the basecoat (B), the clearcoat material being a two-component coating composition.

15 Claims, No Drawings

METHOD FOR PRODUCING A MULTICOAT COATING

The present invention relates to a method for producing a multicoat coating on a substrate by first producing a color and/or effect basecoat on a substrate and subsequently producing a clearcoat on the basecoat. The present invention further relates to a multicoat coating produced by the method of the invention. The coatings produced in this way have not only a high-level optical appearance and good tactile qualities but also outstanding mechanical resistance and flexibility. The method can therefore be used to particular effect in those sectors imposing equal demands on optical quality and mechanical stability and flexibility of coated substrates. Thus, for example, though not exclusively, the method is appropriate for application in the footwear industry, in the coating in particular of soles composed of foam substrates.

PRIOR ART

Mechanical stability and flexibility are properties which are absolutely essential for coatings or varnish coats on substrates in a very wide variety of industrial sectors. Mechanical stability—abrasion resistance and stonechip resistance, for example—is of course critically relevant in any application sector where such external influences are experienced. An acceptable flexibility, though, is very important for the coating of almost any substrate. Flexibility is particularly relevant to the coating of flexible substrates such as foams, textiles, and leather, since the areas of application of such flexible and deformable substrate materials are accompanied by corresponding deformation stresses which affect the coatings as well. On rigid substrates likewise, however, such as hard plastics, metals, or wood, the capacity of the coating to remain intact under deformation stress is very important. For instance, very thin substrates composed of inherently rigid materials may likewise be subject to significant deformations in use. Moreover, changes to materials as a result of temperature differences (expansion coefficient) likewise necessitate a commensurate flexibility on the part of the coatings.

The properties identified are particularly relevant to the coating of substrates such as flexible foam substrates. Foams are an established substrate material in many industrial sectors, for a wide variety of applications. The established position is due to good processing properties, low density, and variable possibilities for the setting of profiles of properties (rigid, semirigid, and flexible foams, thermoplastic or elastomeric foams).

In the footwear industry, for example, compressible, elastically deformable foams are often used in the production of footwear soles such as midsoles, for example. The exposure of soles to massive mechanical stresses is obvious. Walking and running necessitate on the one hand a high flexibility or elasticity of the soles, but on the other hand a commensurate resistance to external mechanical influences as well, such as good abrasion resistance and stonechip resistance, for example.

At the same time, the footwear industry sector, like any sector of the fashion industry, requires the possibility for visual enhancement of the products in question and for their individualization. Imparting color and/or effect to soles correspondingly is of great interest in this regard.

The coating or varnishing of foam substrates such as footwear soles enables precisely this fashion adaptation and individualization.

In this case, however, it is vital for the coating to be optically adapted in an optimum manner. In addition to the coloring itself, a high matting effect or low gloss is also an important factor. This is because this is the only way to produce products having a visually high-value and high-end profile. Products which are too shiny are generally considered to be "plasticky" and cheap-looking.

Much more of a problem, however, is that the overall construction composed of foam substrate and coating and/or varnish coat must be convincing not merely visually through good coloring and/or effect. Instead, as well as the foam substrate, the coating itself, or the overall construction composed of substrate and coating, must have the flexibility already referred to above. It is also necessary to achieve high mechanical resistance on the part of the coating. All in all, therefore, there must first be high flexibility or elasticity, but secondly there must also be effective resistance to external mechanical influences.

US 2006/0141234 A1 describes manufactured articles, footwear soles for example, which comprise a compressible substrate which has been coated with an aqueous coating composition. The composition comprises a polyurethane resin having a hydroxyl number of less than 10, and a colorant. The composition is used for enhancing the visual value of the articles.

WO 2009/101133 A1 discloses composite structures comprising a polyurethane base, such as an integral polyurethane foam, and also a surface coating applied thereon. The surface coating consists of thermoplastic polyurethane, which is applied in the form of a foil. The composite is stable to UV radiation and mechanical load and can be used as an interior automotive component or as a footwear sole.

WO 2008/11375 A1 describes aqueous dispersions comprising at least one polyurethane, at least one specific polyisocyanate, and a silicone compound. The dispersion is used to coat sheetlike substrates such as leather, textile, or plastics, and results in high tactility, grip, and rub fastness.

In spite of these highly promising approaches, there is still potential for improvements, especially with regard to a combination of optical quality and mechanical stability and also flexibility.

OBJECT

It was an object of the present invention, then, to provide a method for producing a multicoat coating via which multicoat coatings on substrates are obtained that initially have good optical quality, more particularly a high matting effect and, consequently, an optically high-grade and refined appearance. At the same time, however, the multicoat coatings ought to have high mechanical resistance and flexibility. This means that they ought first to have a high flexibility or elasticity, allowing the corresponding advantages of flexible substrates in particular to be fully manifested. On the other hand, however, the stability with respect to external mechanical influences ought also to be outstanding. Particular reference may be made to the abrasion resistance and stonechip resistance. In addition, the coating compositions used for producing the multicoat coatings ought to be aqueous, in order to thereby permit the best possible environmental profile.

TECHNICAL ACHIEVEMENT

It has been found that the stated objects could be achieved by a new method for producing a multicoat coating (M) on a substrate (S), comprising the following steps:

(I) producing a basecoat (B) on the substrate by applying an aqueous basecoat material (b) to the substrate (S), the basecoat material being a two-component coating composition comprising
 (b.1) a base component comprising
  (1) at least one polyurethane resin having a hydroxyl number of 15 to 100 mg KOH/g and an acid number of 10 to 50 mg KOH/g,
  (2) at least one aqueous dispersion comprising water and a polyurethane resin fraction consisting of at least one polyurethane resin, the polyurethane resin fraction having a gel fraction of at least 50%, having its glass transition at a temperature of less than −20° C. and having its melting transition at a temperature of less than 100° C.,
  (3) at least one color and/or effect pigment and
 (b.2) a curing component comprising
  (4) at least one hydrophilically modified polyisocyanate (4) having an isocyanate content of 8% to 18%
and also
(II) producing a clearcoat (K) directly on the basecoat (B) by applying an aqueous clearcoat material (k) directly to the basecoat (B), the clearcoat material being a two-component coating composition comprising
 (k.1) a paint base component comprising
  (2) at least one aqueous dispersion comprising water and a polyurethane resin fraction consisting of at least one polyurethane resin, the polyurethane resin fraction having a gel fraction of at least 50%, having its glass transition at a temperature of less than −20° C. and having its melting transition at a temperature of less than 100° C.,
 and
 (k.2) a curing component comprising
  (4) at least one hydrophilically modified polyisocyanate (4) having an isocyanate content of 8% to 18%.

The above-stated method is also referred to below as method of the invention and is, accordingly, a subject of the present invention. Preferred embodiments of the method of the invention are apparent from the description which follows hereinafter and also from the dependent claims.

Further subjects of the present invention are a multicoat coating produced with the method of the invention, and also a substrate coated with such a multicoat coating.

The method of the invention permits the production of multicoat coatings on substrates that exhibit not only outstanding optical qualities but also massive flexibility or elasticity and at the same time an effective stability with respect to external mechanical influences as well. The overall systems comprising the multicoat coating and the substrate can therefore, especially in the case of foam substrates, be used to particularly good effect, though not only, in the footwear industry sector, as soles.

COMPREHENSIVE DESCRIPTION

Elucidation will first be given of a number of terms used in the context of the present invention.

The application of a coating composition to a substrate and the production of a coat thereof on a substrate are understood as follows. The respective coating composition is applied in such a way that the coat produced therefrom is disposed on the substrate, but need not necessarily be in direct contact with the substrate. Between the coat and the substrate, for example, there may also be other coats. For example, in stage (I) of the method of the invention, the basecoat (B) is produced on the substrate, although between substrate and basecoat there may also be further coats disposed—common adhesion primers, for example.

The same principle applies to the application of a coating composition (y) to a coat (X) produced by means of a different coating composition (x), with a coat (Y) being produced on the coat (X). The coat (Y) need not necessarily be in contact with the coat (X), being required merely to be disposed above it, in other words on the side of the coat (X) that is facing away from the substrate.

In contrast to this, the application of a coating composition directly to a substrate, for the production of a coat directly on the substrate, is understood as follows. The respective coating composition is applied in such a way that the coat produced therefrom is disposed on the substrate and is in direct contact with the substrate. In particular, therefore, there is no other coat disposed between coat and substrate.

The same also applies, of course, to the application of a coating composition (y) directly to a coat (X) produced by means of a different coating composition (x), to produce a coat (Y) on the coat (X). In this case, the two coats are in direct contact, and are therefore disposed directly on one another. In particular there is no further coat between the coats (X) and (Y). The same principle applies, of course, to directly successive application of coating compositions or to the production of directly successive coats.

Flashing, interim drying, and curing are understood in the context of the present invention to comprehend the terminological content familiar to the skilled person in connection with methods for producing multicoat coatings.

Flashing, accordingly, is understood fundamentally as a designation for the evaporation or evaporating of organic solvents and/or water from a coating composition applied as part of the production of a varnish coat, usually at ambient temperature (that is, room temperature), 15 to 35° C. for example, for a time of 0.5 to 30 minutes, for example. During flashing, therefore, there is evaporation of organic solvents and/or water present in the applied coating composition. Since the coating composition is still flowable, at any rate directly after application and at the start of flashing, it may flow in the course of flashing. This is because a coating composition applied by spray application, at least, will generally be applied in droplet form and not in uniform thickness. As a result of the organic solvents and/or water present, however, it is fluid and may therefore flow to form a uniform, smooth coating film. At the same time, there is successive evaporation of organic solvents and/or water, resulting after the flashing phase in a comparatively smooth coat, containing less water and/or solvent by comparison with the applied coating composition. After flashing, however, the coat is not yet in the ready-to-use state. While it is no longer flowable, for example, it is still soft and/or tacky, and may be only partly dried. In particular, the coat is not yet cured as described later on below.

Interim drying is therefore understood likewise as the evaporation or evaporating of organic solvents and/or water from a coating composition applied as part of the production of a varnish coat, usually at a temperature elevated relative to ambient temperature, of 40 to 70° C., for example, for a time of 1 to 30 minutes, for example. In the case of interim drying as well, therefore, the applied coating composition will lose a fraction of organic solvents and/or water. Relative to a particular coating composition, it is generally the case that interim drying, in comparison to the flashing, takes place at, for example, higher temperatures and/or for a longer time, meaning that, in comparison to the flashing, a higher fraction of organic solvents and/or water also escapes from the applied coat. Ultimate delimitation of the two terms from one another, however, is neither necessary nor desirable. For ease of comprehension, these terms are used in order to make it clear that a variable and sequential conditioning of a coat may take place, prior to the curing described below. Depending on the coating composition, the evaporation temperature, and the evaporation time, more or less high fractions of the organic solvents and/or water present in the coating composition may evaporate. Possibly there may even already be interlooping or crosslinking among a fraction of the binder polymers present in the coating composition, as described below. Neither during flashing nor during interim drying, however, is a ready-to-use coat obtained, as is the case for the curing described below. Curing, accordingly, is clearly delimited from the flashing and interim drying.

The curing of a coat is understood accordingly to be the conversion of such a coat into the ready-to-use state, in other words into the state in which the substrate furnished with the respective coat can be transported, stored, and used in its intended manner. A cured coat, then, is in particular no longer soft or tacky, but instead is conditioned as a solid coating film which, even on further exposure to curing conditions as described later on below, no longer exhibits any substantial change in its properties such as hardness or adhesion to the substrate.

As is known, coating compositions may in principle be cured physically and/or chemically, depending on components present such as binders and crosslinking agents. In the case of chemical curing, particular consideration is given to thermochemical curing.

In the context of the present invention, "physically curable" or the term "physical curing" means the formation of a cured coat by loss of solvent from polymer solutions or polymer dispersions, with the curing being achieved by interlooping of polymer chains. Coating compositions of these kinds are formulated generally as one-component coating materials. A cure may take place, for example, between 15 and 100° C. over a time of 2 to 48 hours. In this case, curing differs from flashing and/or interim drying, therefore, possibly only in the time of the conditioning of the coat.

In the context of the present invention, "thermochemically curable" or the term "thermochemical curing" means the crosslinking of a coat (formation of a cured coat) that is initiated by chemical reaction of reactive functional groups, the energetic activation of this chemical reaction being possible through thermal energy. Different functional groups which are complementary to one another can react with one another (complementary functional groups), and/or the formation of the cured coat is based on the reaction of autoreactive groups, in other words functional groups which react among one another with groups of their own kind. Examples of suitable complementary reactive functional groups and autoreactive functional groups are known from German patent application DE 199 30 665 A1, page 7, line 28, to page 9, line 24, for example. The groups are then present in the various film-forming components of the coating composition.

Thermochemical curing may be enabled through use of any of a very wide variety of different film-forming components. Typical, for example, is the use of an organic polymer such as a polyester or polyurethane containing particular functional groups such as hydroxyl groups, and of a further component, as for example a polyisocyanate and/or an amino resin, which are able then to lead to a cured coating film by reaction of the correspondingly complementary functional groups. For greater ease of comprehension, the (first) organic polymer, the polyester for example, is often referred to as the binder, and the polyisocyanate and/or amino resin as the crosslinking agent.

Depending on the reactivity of the functional groups present in the film-forming components, coating compositions of these kinds are formulated as one-component and multicomponent systems, more particularly two-component systems.

In thermochemically curable one-component systems, the components to be crosslinked—for example, organic polymers as binders, and crosslinking agents—are present alongside one another, in other words in one component. A requirement for this is that the components to be crosslinked should only react with one another—that is, enter into curing reactions—at higher temperatures of more than 100° C., for example. Curing, therefore, will take place under corresponding conditions, such as at temperatures of 100 to 250° C. for a time of 5 to 60 minutes, for example.

In thermochemically curable two-component systems, the components to be crosslinked—for example, the organic polymers as binders, and the crosslinking agents—are present separately from one another in at least two components, which are not combined until shortly before application. This form is selected when the components to be crosslinked react with one another even at ambient temperatures or slightly elevated temperatures of between 40 and 100° C., for example. Reference may be made by way of example to hydroxyl groups or amino groups on the one hand and to free isocyanate groups on the other. In general, and particularly in the context of the present invention, a two-component coating composition is formulated in such a way that a first component (paint base component) and a second component (curing component) are produced and stored separately from one another and are not combined until shortly before application to a substrate. The exact working time (that is, the time within which the coating composition can be processed at room temperature (15 to 25° C., especially 20° C.) without, for example, such a great increase in viscosity, as a result of corresponding crosslinking reactions at room temperature, that application is no longer possible) is of course dependent on the constituents used, but in general is between 1 minute and 4 hours, preferably between 5 and 120 minutes.

Likewise assignable to thermochemical curing is the following principle. A first component of the coating composition may react, with addition of a further component, in such a way that there is proportional formation of functional groups which are able to enter into curing reactions as described above with other functional groups of the first component. In this way, then, there is again a contribution to film formation. For example, a free polyisocyanate, in other words a first component containing on average more than one free isocyanate group per molecule, will react correspondingly following addition of water as a second component. The reason is that free isocyanate groups react with water, with elimination of carbon dioxide, to form free primary amino groups, which are then converted into urea bonds by addition reaction with isocyanate groups that are still present.

A coating composition in whose curing this form of thermochemical curing is to be employed will therefore likewise be formulated as a two-component coating composition. The reason is that both the hydrolysis of the isocyanate groups to amino groups and the reaction of amino groups with isocyanate groups take place even at ambient temperatures or slightly elevated temperatures of between 40 and 100° C., for example. Therefore, while the water is present in one component, the free polyisocyanate will be integrated into the second component. Then, after the two components have been combined, the primary amino groups are formed, and are able to react with isocyanate groups still present and so to form a network.

Of course, in the curing of a coating composition identified as being thermochemically curable, there will always also be physical curing, in other words interlooping of polymer chains. Nevertheless, a coating composition of this kind will be referred to in this case as thermochemically curable. This designation, then, is selected whenever the coating composition can proportionally be thermochemically cured.

In the context of the present invention, the curing of two-component coating compositions takes place preferably at temperatures between 40 and 120° C. The duration of curing is of course dependent on the circumstances of the case in hand, but is generally from 5 to 120 minutes, for example.

All of the temperatures elucidated in the context of the present invention should be understood as the temperature of the space within which the coated substrate is located. They do not therefore mean that the substrate itself must have the temperature in question.

Depending on the substrate used, it is necessary of course to ensure, in the context of the method of the invention, that the substrate, for the curing of coating films applied thereof, is not heated to such a level that it undergoes decomposition or deformation. Foam substrates, which are used with preference in the context of the present invention, are not dimensionally stable, however, in general at temperatures of 120° C. or more. Possibly even much lower temperatures are already sufficient to bring about decomposition or deformation of a substrate. At any rate, the curing of the coats in the context of the present invention is carried out preferably at below 120° C., more preferably below 100° C.

It is also understandable in this context that the basecoat material (b) and the clearcoat material (k) are two-component coating compositions. This is because, as described above, they can be cured at temperatures between 40 and 100° C. This ensures that the substrate need only be heated to temperatures of less than 100° C. Depending on the substrate used, however, they may also be heated to higher temperatures for even quicker curing, however. It is nevertheless preferred for any curing operations in the context of the method of the invention to be carried out at below 120° C., even more preferably at below 100° C.

With preference the foam substrate in the context of the method of the invention will never be exposed to temperatures of 120° C. or more, preferably never to temperatures of 100° C. or more.

Where reference is made in the context of the present invention to an official standard, without indication of the official validity period, the reference is of course to the version of the standard valid on the filing date or, if there is no valid version at that date, then to the most recent valid version.

THE METHOD OF THE INVENTION

In the context of the method of the invention, a multicoat coating (M) is produced on a substrate (S).

As substrates (S) it is possible ultimately to use all rigid or flexible substrates known to the skilled person, examples being those composed of metals, hard plastics, wood, paper and card, textiles, leather goods, and foams. Preference in the context of the present invention is given to flexible substrates, more particularly flexible foam substrates, since the properties identified at the outset are particularly important in the coating of such substrates.

As a brief basic introduction, foam substrates (S) contemplated are ultimately all substrates known in this context to the skilled person. In principle, therefore, it is possible to use foams produced from thermosets, thermoplastics, elastomers, or thermoelastics, in other words obtained by corresponding foaming processes from plastics from the stated classes of polymer. In terms of their chemical basis, possible foams include for example, but not exclusively, polystyrenes, polyvinyl chlorides, polyurethanes, polyesters, polyethers, polyetheramides, or polyolefins such as polypropylene, polyethylene, and ethylene-vinyl acetate, and also copolymers of the polymers stated. A foam substrate may of course also include a variety of the polymers and copolymers identified.

Preferred foam substrates are flexible foam substrates, especially preferably flexible thermoplastic polyurethane foam substrates. The latter, then, are foam substrates comprising thermoplastic polyurethane as their polymeric plastics matrix. A fundamental quality of such substrates is that they are compressible and elastically deformable.

In the production of the foams, the thermoplastic polyurethane is foamed—that is, converted into a foam—by corresponding foaming processes.

Foaming processes are known, and will therefore be presented only briefly. A fundamental principle in each case is that blowing agents and/or gases in solution in the plastic or in a corresponding plastics melt, and formed on crosslinking reactions in the production of corresponding polymeric plastics, are released and so bring about the foaming of the hitherto comparatively dense polymeric plastics. For example, where a low-boiling hydrocarbon is employed as a blowing agent, it vaporizes at elevated temperatures and leads to foaming. Gases such as carbon dioxide or nitrogen as well can be introduced into the melt at high pressure and/or dissolved therein, as blowing agents. As a result of a later drop in pressure, the melts then foam during the escape of the blowing agent gas.

The foaming may take place, for example, directly during shaping of corresponding plastics substrates, as for example in the course of extrusion or injection molding. The plastics melt, under pressure and with blowing agent added, may be foamed, for example, on emergence from an extruder, by virtue of the pressure drop that then occurs.

It is also possible first to produce pellets of thermoplastic, these pellets containing blowing agent, and then to foam these pellets subsequently in a mold, with the pellets increasing their volume, fusing with one another, and ultimately forming a molding consisting of fused expanded foam beads (also called thermoplastic bead foam). The expandable pellets may be formed, for example, by extrusion and subsequent pelletizing of the polymer strand exiting the extruder. Pelletization is accomplished, for example, via appropriate chopping devices, operating under pressure and temperature conditions such that no expansion occurs. The expansion that then follows and the fusing of the pellets take place in general with the aid of steam at temperatures of around 100° C.

It is also possible to start from plastics pellets that have already been prefoamed when producing thermoplastic bead foams. These are pellets whose individual pellets or polymer beads, in comparison to pellets that have not been prefoamed, already exhibit substantially increased bead sizes with correspondingly reduced densities. The production of beads with controlled prefoaming can be realized by appropriate process control, as described in WO 2013/153190 A1, for example. Hence, on exiting the extruder, extruded polymer strands may be passed into a pelletizing chamber with a stream of liquid, the liquid being under specific pressure and having a specific temperature. Through adaptation of the operating parameters, it is possible to obtain specific expanded or preexpanded thermoplastic pellets, which can be converted into thermoplastic bead foam substrates by subsequent fusing and, optionally, further expansion with—in particular—steam.

Thermoplastic bead foams and corresponding thermoplastic, expandable and/or expanded pellets from which such bead foams may be produced are described in WO 2007/082838 A1, WO 2013/153190 A1 or else WO 2008/125250 A1, for example. Also described therein are operational parameters and starting materials for the production of thermoplastic polyurethanes, and also operational parameters for the production of pellets and bead foams.

Thermoplastic bead foams, especially thermoplastic polyurethane bead foams, can be produced in a very economic way, on an industrial scale in particular and are also particularly advantageous in terms of their profile of properties. Accordingly, thermoplastic bead foams may be produced from thermoplastics, more particularly from polyurethanes, the foams exhibiting outstanding flexibility or elasticity and mechanical stability. In general they are compressible and readily elastically deformable. Accordingly, these foams especially are particularly suitable as foam substrates for applications in sectors such as the footwear industry. Especially preferred substrates, then, are compressible, elastically deformable bead foam substrates which comprise thermoplastic polyurethane as their polymeric plastics matrix.

The substrates, preferably the flexible foam substrates, may intrinsically have any desired shape—that is they may, for example, be simple sheetlike substrates or else more complex shapes such as, in particular, footwear soles such as midsoles.

In stage (I) of the method of the invention a basecoat (B) is produced. It is produced by applying an aqueous basecoat material (b) to the substrate (S).

The basecoat material may be applied directly to the substrate, meaning that no further coats are disposed between the substrate and the basecoat. It is nevertheless equally possible for at least one other coat such as an adhesion primer coat to be produced first on the substrate. Since, however, in spite of the omission of such other coats, the adhesion achieved is outstanding, and since such omission makes the method massively simpler, it is preferred for the basecoat material (b) to be applied directly to the substrate.

The terms basecoat material and basecoat in relation to the coating compositions applied in stage (I) of the method of the invention and the coats produced are used for ease of comprehension. The basecoat material is an intermediate coating material which imparts color and/or effect and which is used in general industrial coating. In general, and also in the context of the method of the invention, at least an additional clearcoat is applied over a basecoat. The individual coats may be cured each separately or, finally, together.

The basecoat materials (b) are described in detail later on below. In any case, however, through the presence of water in the paint base component, and of component (4) in the curing component, the compositions in question are in any case thermochemically curable two-component coating compositions.

The basecoat materials (b) may be applied by the methods known to the skilled person for applying liquid coating compositions, as for example by dipping, knife coating, spraying, rolling, or the like. Preference is given to employing spray application methods, such as compressed air spraying (pneumatic application), airless spraying, high-speed rotation, electrostatic spray application (ESTA), optionally in conjunction with hot spray application such as hot air (hot spraying), for example. With very particular preference the basecoat materials are applied by pneumatic spray application or electrostatic spray application.

The application of the basecoat material (b) therefore produces a basecoat (B), in other words a coat of the basecoat material (b) that is applied on the substrate (S).

The basecoat (B) can be cured within the stage (I) of the method of the invention, in other words before the application of a clearcoat material (k) that takes place in stage (II). It is preferred, however, for the basecoat (B) not to be cured within stage (I). Preferably, instead, the basecoat (B) is cured after the production of the clearcoat (K), together with that coat. In other words, basecoat and clearcoat materials are applied by the known wet-on-wet method. Following its production, the basecoat is optionally flashed and/or interim-dried, but not cured. This is followed by production of a clearcoat, which is then cured together with the basecoat.

In stage (I), therefore, the basecoats are preferably not exposed to conditions which may already lead to curing. This means in particular that the basecoats are preferably exposed for not longer than 10 minutes to temperatures of greater than 60° C. Under these conditions, indeed, thermochemically curable two-component coating compositions are generally not cured. Irrespective of whether the basecoat material (b) or the corresponding basecoat (B) is cured separately, flashing and/or interim drying take place preferably after application and before any separate curing, at 15 to 35° C. for a time of 0.5 to 30 minutes.

The application of the basecoat material (b) takes place such that the basecoat (B) after curing has a film thickness of, for example, 3 to 50 micrometers, preferably 5 to 40 micrometers.

In stage (II) of the method of the invention, a clearcoat (K) is produced directly on the basecoat (B). It is produced by corresponding application of a clearcoat material (k). The clearcoat (K) is therefore disposed directly on the basecoat (B).

A clearcoat material (k) is a transparent coating composition which is known in this sense to the skilled person. "Transparent" should be understood to mean that a coat formed with the coating composition is not coloredly hiding, but instead has a constitution such that the color of the underlying basecoat system is visible. This, as is known, however, does not rule out the possibility of pigments being present in minor amounts even in a clearcoat material, such pigments having the capability, for example, to support the depth of color of the overall system.

The clearcoat materials (k) as well are described in detail later on below. As a result of the presence of water in the paint base component and of component (4) in the curing component, however, the compositions in question are at any rate thermochemically curable two-component coating compositions.

The clearcoat materials (k) as well may be applied by the methods known to the skilled person for applying liquid coating compositions, as for example by dipping, knife coating, spraying, rolling, or the like. Preference is given to employing spray application methods, such as compressed air spraying (pneumatic application), airless spraying, high-speed rotation, electrostatic spray application (ESTA), optionally in conjunction with hot spray application such as hot air (hot spraying), for example. With very particular preference the clearcoat materials are applied by pneumatic spray application or electrostatic spray application.

The clearcoat material (k) or the corresponding clearcoat (K) is subjected to flashing and/or interim drying at 15 to 35° C. for a duration of 0.5 to 30 minutes, preferably, after its application.

This is followed by the curing of the clearcoat (K) produced, to give a cured clearcoat. The clearcoat is preferably cured together with the basecoat (B) disposed directly beneath it, this basecoat preferably not being cured before stage (II) of the method of the invention.

For ease of comprehension, this joint curing may be designated as preferred stage (III) of the method of the invention.

The curing, preferably the joint curing, takes place preferably at temperatures between 40 and 120° C., more preferably between 60 and 100° C., for a time of 5 to 120 minutes, for example, preferably 20 to 60 minutes. This also has the effect of preventing possible deformation or decomposition particularly of preferred substrates. If the basecoat (B) is cured separately before stage (II) of the method, such an approach nevertheless being less preferable, then the temperature and time conditions reported for the joint curing are preferably applied.

The result after the end of stage (II) of the method of the invention, preferably after the end of stage (III), is a multicoat paint system of the invention.

In the context of the method of the invention, it is of course also possible for further coating compositions to be applied after or before the application of a basecoat material (b) and/or of a clearcoat material (k), and for further coats to be produced in this way. These may be further basecoat materials (b), further clearcoat materials (k), or else different coating compositions. It is important, however, that in any case there is a clearcoat (K) disposed directly on the basecoat (B). A clearcoat (K) is preferably the topmost coating of the multicoat coating. More preferably there is precisely one basecoat material, namely a basecoat material (b), and precisely one clearcoat material, namely a clearcoat material (k), applied. With preference, therefore, the multicoat coating disposed on the substrate consists of precisely two coats.

THE BASECOAT MATERIALS FOR INVENTIVE USE

The basecoat material for inventive use comprises at least one specific polyurethane resin (1) in the paint base component.

The starting components which can be used in preparing the polyurethane resins (1), and the underlying conversion reactions, are subject fundamentally to what the skilled person knows in that connection. Hence the resins are preparable, for example, by conventional polyaddition of polyisocyanates with polyols and also polyamines.

Polyisocyanates contemplated include the known aliphatic, cycloaliphatic, aliphatic-cycloaliphatic, aromatic, aliphatic-aromatic and/or cycloaliphatic-aromatic polyisocyanates, examples being the polyisocyanates (4a) identified later on below.

Examples of suitable polyols are saturated or olefinically unsaturated polyester polyols and/or polyether polyols. Employed more particularly as polyols are polyester polyols. Such polyester polyols, preferably polyester diols, may be prepared in a known way by the action of corresponding polycarboxylic acids and/or their anhydrides with corresponding polyols by esterification. Of course it is also possible, optionally and additionally, for proportional use to be made of monocarboxylic acids and/or monoalcohols for the preparation. The polyester diols are preferably saturated, more particularly saturated and linear.

Examples of suitable aromatic polycarboxylic acids for preparing such polyester polyols are phthalic acid, isophthalic acid, and terephthalic acid, of which isophthalic acid is advantageous and is therefore used with preference. Examples of suitable aliphatic polycarboxylic acids are oxalic acid, malonic acid, succinic acid, glutaric acid, adipic acid, pimelic acid, suberic acid, azelaic acid, sebacic acid, undecanedicarboxylic acid, and dodecanedicarboxylic acid, or else hexahydrophthalic acid, 1,3-cyclohexane-dicarboxylic acid, 1,4-cyclohexanedicarboxylic acid, 4-methylhexahydrophthalic acid, tricyclodecanedicar-boxylic acid, and tetrahydrophthalic acid. Likewise it is possible to use dimer fatty acids or dimerized fatty acids, which, as is known, are mixtures prepared by dimerizing unsaturated fatty acids and obtainable for example under the trade designations Radiacid (from Oleon) or Pripol (from Croda). The use of such dimer fatty acids for preparing polyester diols is preferred in the context of the present invention. Polyols used with preference for preparing the polyurethane resins (1) are therefore polyester diols prepared using dimer fatty acids. Especially preferred are polyester diols in whose preparation at least 50 wt %, preferably 55 to 85 wt %, of the dicarboxylic acids used are dimer fatty acids.

Even more preferred are polyurethane resins (1) in whose preparation the fraction of such polyester diols used is between 30 and 80 wt %, more preferably between 40 and 70 wt %, based in each case on the total amount of the starting compounds used in preparing the polyurethane resin.

Examples of corresponding polyols for preparing polyester polyols, preferably polyester diols, are ethylene glycol, 1,2- or 1,3-propanediol, 1,2-, 1,3-, or 1,4-butanediol, 1,2-, 1,3-, 1,4-, or 1,5-pentanediol, 1,2-, 1,3-, 1,4-, 1,5-, or 1,6-hexanediol, neopentyl hydroxypivalate, neopentyl glycol, diethylene glycol, 1,2-, 1,3-, or 1,4-cyclohexanediol, 1,2-, 1,3-, or 1,4-cyclohexanedimethanol, and trimethylpentanediol. Preference is therefore given to using diols. Such polyols and diols may of course also be used directly for preparing the polyurethane resins (1)—that is, may be reacted directly with polyisocyanates.

Further possibilities for use in preparing the polyurethane resins (1) are polyamines such as diamines and/or amino alcohols. Diamines are exemplified by hydrazine, alkyl- or cycloalkyldiamines such as propylenediamine and 1-amino-3-aminomethyl-3,5,5-tri-methylcyclohexane, and amino alcohols by ethanolamine or diethanolamine. Corresponding polyurethane resins in that case therefore also contain urea bonds. Resins of this kind, however, are referred to generally and also in the context of the present invention as polyurethane resins.

With preference for preparing the polyurethane resins (1) a polyol having more than two hydroxyl groups is also used. This gives the polyurethane resin (1) branching points. Preferably, therefore, the polyurethane resins (1) are branched. Examples of suitable higher polyfunctional alcohols (OH functionality more than 2) include trimethylolpropane, glycerol, and pentaerythritol, preferably trimethylolpropane. Preferred polyurethane resins (1) are those in whose preparation the fraction of such higher polyfunctional alcohols used, especially of trimethylolpropane, is between 1 and 6 wt %, more preferably between 2 and 5 wt %, based in each case on the total amount of the starting compounds used in preparing the polyurethane resin.

The polyurethane resins (1) are hydroxyl-functional and possess a hydroxyl number of 15 to 100 mg KOH/g, preferably 20 to 40 mg KOH/g (measured according to DIN 53240). In this way the polyurethane resin (2) with the isocyanate groups of the hydrophilically modified polyisocyanate (4) described later on below can enter into crosslinking reactions and can make a contribution to the thermal curing.

Moreover, the polyurethane resins (1) are carboxyl-functional and possess an acid number of 10 to 50 mg KOH/g, preferably 15 to 35 mg KOH/g (measured according to DIN EN ISO 3682). In this way, the polyurethane resin (1) becomes soluble or dispersible in water. As the skilled person is aware, this means that the polymers, in at least proportionally aqueous media, do not precipitate in the form of insoluble agglomerates, but instead form a solution or finely divided dispersion. It is known that this generally is advantageously influenced by or even necessitates the introduction of potentially ionic groups, as for example potentially anionic groups, preferably carboxyl groups. Such groups are introduced into the polymer more particularly by corresponding monomers employed during the preparation process, with the finished polymer then including these groups. Accordingly, in the preparation of the polyurethane resins (1), it is preferred for monomers to be used which include carboxylic acid groups as well as groups for reaction in the preparation of urethane bonds, preferably hydroxyl groups. The corresponding groups are introduced into the prepolymer in this way. Examples of compounds preferred in this sense include monocarboxylic acids comprising two hydroxyl groups such as, for example, dihydroxypropionic acid, dihydroxysuccinic acid, and dihydroxybenzoic acid. Especially preferred are alpha,alpha-dimethylolalkanoic acids such as 2,2-dimethylolacetic acid, 2,2-dimethylolpropionic acid, 2,2-dimethylolbutyric acid, and 2,2-dimethylolpentanoic acid, especially 2,2-dimethylolpropionic acid.

In order to obtain even better dispersibility in water, the carboxyl groups may be converted at least proportionally into carboxylate groups through specific neutralization. This means, therefore, that these groups are neutralized, for example during and/or after preparation of the polyurethane resins (1), with neutralizing agents, preferably ammonia, amines and/or, in particular, amino alcohols. Used by way of example for the neutralization are di- and triethylamine, dimethylaminoethanol, diisopropanolamine, morpholines and/or N-alkylmorpholines.

The indication "soluble or dispersible in water" does not mean that the respective polyurethane resin (1) also has to be prepared in aqueous phase or has to be used in a form present in aqueous dispersion in the basecoat material (b). The polymer can, for example, also be prepared in organic solvents or acquired commercially as a dispersion in organic solvents, and used in this way in the basecoat material for inventive use. Water as well is then added in the course of subsequent mixing with the further constituents of the basecoat material. The polyurethane resin (1) is preferably prepared in organic solvents such as, for example, methyl ethyl ketone, butyl glycol and/or other known organic solvents.

Suitable polyurethane resins (1) have, for example, a number-average molecular weight of 500 to 20 000 g/mol. The weight-average molecular weight is situated for example in the range from 5000 to 50 000 g/mol. The molecular weights for the purposes of the present invention are determined by GPC analysis using THF (+0.1% acetic acid) as eluent (1 ml/min) on a styrene-divinylbenzene column combination. Calibration is performed using polystyrene standards.

The fraction of the at least one polyurethane resin (1) may be, for example, in the range from 0.5 to 5 wt %, preferably from 0.75 to 4.0 wt %, more preferably 1.0 to 3.0 wt %, based in each case on the total weight of the basecoat material for inventive use.

The basecoat material (b) for inventive use comprises at least one specific aqueous dispersion (2) in the paint base component (b.1).

The aqueous dispersion (2) in any case includes water and a polyurethane resin fraction, this polyurethane resin fraction consisting of at least one polyurethane resin. The polyurethane resin fraction is of course different from the above-described polyurethane resin (1).

Polyurethane resins, their preparation, and starting products which can be employed are known and are also elucidated earlier on above in the description of the polyurethane resins (1). With regard to the dispersion (2) for inventive use, and to the polyurethane resin fraction and the polyurethane resins that constitute this fraction, however, there are specific conditions applying, which are elucidated below.

The polyurethane resin fraction possesses a gel fraction of at least 50% (for measurement method, see Examples section).

The dispersions (2) for inventive use therefore constitute microgel dispersions. A microgel dispersion, as is known, is initially a polymer dispersion, in other words a dispersion in which there is at least one polymer as dispersed medium in the form of particles or polymer particles. The polymer particles are at least partly intramolecularly crosslinked. The latter means that the polymer structures present within a particle equate at least partly to a typical macroscopic network with a three-dimensional network structure. Viewed macroscopically, however, a microgel dispersion of this kind is still a dispersion of polymer particles in a dispersion medium, in the present case, more particularly, water. While the particles can in part form crosslinking bridges between one another (something which in fact can hardly be ruled out simply from the preparation process), the system is nevertheless in any case a dispersion with discrete particles present in it that have a measurable particle size.

Because the microgels represent structures which lie between branched and macroscopic crosslinked systems, they combine, consequently, the characteristics of macromolecules with network structure that is soluble in suitable organic solvents, and of insoluble macroscopic networks, and so the fraction of the crosslinked polymers can be determined, for example, only following isolation of the solid polymer, after removal of water and any organic solvents, and subsequent extraction. The phenomenon utilized here is that the microgel particles, originally soluble in suitable organic solvents, retain their inner network structure after isolation and behave, in the solid, like a macroscopic network. Crosslinking may be verified via the experimentally accessible gel fraction. The gel fraction is ultimately that fraction of the polymer from the dispersion that cannot be molecularly dispersely dissolved, as an isolated solid, in a solvent. This insoluble fraction corresponds in turn to that fraction of the polymer that is present in the dispersion in the form of intramolecularly crosslinked particles or particle fractions.

The polyurethane resin fraction present in the dispersion (2) preferably possesses a gel fraction of at least 55%. The gel fraction may therefore be up to 100% or approximately 100%, as for example 99% or 98%. In such a case, then, the entire or virtually the entire polyurethane resin which makes up the polyurethane resin fraction is present in the form of crosslinked particles. It is sufficient, however, for at least half of the polyurethane resin fraction to be in the form of crosslinked particles.

The polyurethane resin fraction has its glass transition at a temperature of less than −20° C. and its melting transition at a temperature of less than 100° C. (for measurement method, see Examples section).

This therefore means immediately that the polyurethane resin fraction in any case has semicrystalline character. Indeed, as is known, a glass transition always means that an amorphous solid (glasslike, not crystalline) softens, whereas a melting transition means that a crystalline system melts— that is, crystalline structures present beforehand are no longer present thereafter. Resins or polymers which are purely amorphous on an ideal-theoretical basis therefore have only a glass transition, but not a melting transition (or any such transition is not resolvable technically when the actual system is measured). Polymers which are highly or purely crystalline on an ideal-theoretical basis have only melting transitions, but do not possess a glass transition (or any such transition is not resolvable technically when measured on the actual system). A system in which both characteristics, in other words amorphous and crystalline properties, are clearly present therefore exhibits both a glass transition and a melting transition. The system therefore has both amorphous and crystalline domains (semicrystalline). Of course, the melting transition always proceeds at higher temperatures than the glass transition.

Wording to the effect that the polyurethane resin fraction has its glass transition at a temperature of less than −20° C. therefore means that from the corresponding temperature onward, there is no longer a glasslike structure (no amorphous solid structure) present in the polyurethane resin fraction. The glass transition can be understood technically by measurement (for further details, see Examples section).

Wording to the effect that the polyurethane resin fraction has its melting transition at a temperature of less than 100° C. therefore means that from the corresponding temperature onward, there are no longer any crystallites present. However, even before the temperature in question has been reached, and above the glass transition temperature, the system is of course already partly softened. Indeed, exactly such partial softening of the amorphous fraction occurs at the glass transition. The melting transition may likewise be understood technically by measurement (for further details, see Examples section). In any case, however, the melting transition takes place below a temperature of 100° C.

Accordingly, the polyurethane resin fraction may comprise polyurethane resins which are semicrystalline, and/or it comprises both highly crystalline and amorphous polyurethane resins.

The polyurethane resin fraction has its glass transition at a temperature of less than −20° C. Preferably the glass transition is in the range from −100° C. to less than −20° C., more preferably −90° C. to −40° C.

The polyurethane resin fraction has its melting transition at a temperature of less than 100° C. Preferably the melting transition is at a temperature in the range from −20° C. to less than 90° C., more preferably −15° C. to less than 80° C.

The component (2) for use is an aqueous dispersion meaning that it comprises a dispersion medium, in the present case water more particularly, and particles dispersed therein, these being polymer particles. Accordingly, the polyurethane resin fraction and the polyurethane resins which make up that fraction are dispersed in the form of polymer particles in the dispersion medium. The particle size of the polyurethane resin particles is situated, for example, within the customary ranges for polymer dispersions. It is preferable though for the polyurethane resin fraction to include at any rate, though not necessarily exclusively, particles having a size of greater than 1 micrometer. Preferred ranges here are from 1 to 100 micrometers. The particle size at this point should not be understood as an average particle size of all the particles in the dispersion. That detail would be impracticable, especially in the event that the polyurethane resin fraction was composed of different polyurethane resins and/or polyurethane particles having not a monomodal distribution but rather a multimodal—bimodal, for example—distribution. The situation instead is that the dispersion fundamentally includes particles which lie within the corresponding size range. A particle size distribution obtained technically by measurement (distribution curve, volume density) which may therefore be monomodal or multimodal, bimodal for example, then indicates that the dispersion includes particles within the stated range. The distribution curves (volume density) can be determined by laser diffraction, allowing optimum capture of size distributions within the corresponding range. Measurement took place for the purposes of the present invention with a Mastersizer 3000 particle size measuring instrument (from Malvern Instruments). To set the concentration range suitable for measurement, the sample was diluted with particle-free, deionized water as dispersing medium (refractive index: 1.33), the obscuration was set at between 3% and 15%, depending on each sample, and measurement took place in the Hydro 2000G dispersing unit (from Malvern Instruments). Measurement took place at a stirring speed of 3000 1/min, with equilibration at this speed for 5 minutes prior to the measurement. The volume-weighted size distribution was calculated using the Malvern Instruments software (version 5.60) by means of Fraunhofer approximation.

With preference, the dispersion (2), based on the total weight of the polyurethane resin fraction, comprises at least 10 wt %, preferably at least 20 wt %, more preferably at least 30 wt %, and very preferably at least 50 wt % of polyurethane resin particles having a particle size of more than 1 micrometer, preferably 1 to 100 micrometers. The polyurethane resin fraction, which consists of at least one polyurethane resin which is present in the form of disperse particles, therefore includes at least 10 wt % (or at least 20 wt %, 30 wt %, 50 wt %) of particles having such sizes.

The polyurethane resin fraction of the dispersion (2) is preferably not thermochemically curable with components containing isocyanate groups, such as a hydrophilically modified polyisocyanate (4), for example. This means that by combining the corresponding polyurethane resins of the dispersion (2) with a component containing isocyanate groups it is not possible to form a typical thermochemically cured coating. Accordingly, the at least one polyurethane resin in the polyurethane resin fraction preferably does not possess, or possesses only a minor amount of, any functional groups which are able to enter into crosslinking reactions with isocyanate groups under crosslinking conditions as described earlier on above. Minor amounts means that the groups in question are not deliberately incorporated in notable amounts into the polymers during their preparation, but instead, for purely statistical reasons, for example, are not fully converted in the actual reaction of corresponding starting products, and then remain in the polymer. Thus, when using corresponding starting products for preparing polyurethanes, hydroxyl groups and amino groups may of course also be present in the resulting polymer if these groups are used in equimolar or even minor molar amounts in comparison to the polyisocyanates likewise to be employed. The reasons for this are purely technical reasons associated with the synthesis. Preferably, however, there is no deliberate incorporation of such groups, especially through the use of a significant molar excess of such groups during the preparation of polyurethanes. Consequently, the amounts of functional groups still present that are able to enter into crosslinking reactions with isocyanate groups under crosslinking conditions as described above, more particularly of hydroxyl groups and amino groups, are preferably not sufficient for a typical thermochemically cured coating to be formed through the use of these polyurethane resins.

It follows from the above that the hydroxyl number (for measurement method, see above) and the amine number (measured according to DIN 53176) of the polyurethane resin fraction are preferably less than 20, especially preferably less than 10.

In the preparation of the polyurethane resins which make up the polyurethane resin fraction, the amounts of the starting products for the preparation are preferably selected such that the ratio of the total molar amount of isocyanate groups to the total molar amount of functional groups which are able to enter into crosslinking reactions with isocyanate groups, more particularly of hydroxyl groups and amino groups, is greater than 0.9. More preferably the stated ratio is greater than 0.95, especially at least 1.0, very preferably exactly 1.0.

The polyurethane resin fraction preferably comprises potentially ionic groups, for example potentially anionic groups, preferably carboxylic or sulfonic acid groups, especially carboxylic acid groups. As already described above in the context of the description of the polyurethane resin (1), such groups are advantageous in the formation of an aqueous dispersion. Accordingly, in the preparation of the polyurethane resins which make up the polyurethane resin fraction, preference is given to using monomers which as well as groups for reaction in the preparation of urethane bonds, preferably hydroxyl groups and/or amino groups, also include carboxylic or sulfonic acid groups. In this way the groups in question are introduced into the prepolymer. Examples of compounds preferred in this context include monocarboxylic acids containing two hydroxyl groups or two amino groups, such as dihydroxypropionic acid, dihydroxysuccinic acid, and dihydroxybenzoic acid, for example, and also N-(2-aminoethyl)-2-aminoethanecarboxylic acid and N-(2-aminoethyl)-2-aminosulfonic acid. Especially preferred are alpha,alpha-dimethylolalkanoic acids such as 2,2-dimethylolacetic acid, 2,2-dimethylolpropionic acid, 2,2-dimethylolbutyric acid, and 2,2-dimethylolpentanoic acid, especially 2,2-dimethylolpropionic acid, and also N-(2-aminoethyl)-2-aminoethanecarboxylic acid. A controlled, at least proportional neutralization of the stated groups using neutralizing agents already identified above is of course likewise possible.

The dispersion (2) is aqueous. The expression "aqueous" in connection with aqueous polymer dispersions is known. Such a dispersion includes water in particular as dispersion medium. The principal constituents of the dispersion (2) are therefore water and the polyurethane resin fraction. The dispersion (2) may of course, however, also contain further constituents additionally. Examples include organic solvents and/or typical auxiliaries such as emulsifiers and protective colloids. Likewise present there may be, for example, inorganic components such as pigments or else silicates or polysilicates, in which case the latter, for example, may contribute to the matting effect of the multicoat coating which is ultimately to be produced.

The fraction of the polyurethane resin fraction in the dispersion (2) is preferably 15 to 60 wt %, preferably 20 to 50 wt %, based in each case on the total amount of the dispersion (2).

The fraction of water in the dispersion (2) is preferably 40 to 85 wt %, preferably 50 to 80 wt %, based in each case on the total amount of the dispersion.

The sum of the fraction of the polyurethane resin fraction and the fraction of water in the dispersion is preferably at least 75 wt %, preferably at least 85 wt %.

The dispersions (2) described may be prepared by methods known to the skilled person, as for example by reaction of corresponding starting components in organic solvents for the preparation of polyurethane resins, and subsequent dispersal in aqueous phase and removal of organic solvents. Corresponding dispersions are also available commercially, for example, under the trade name Astacin Novomatt (from BASF), for example.

The fraction of the at least one aqueous dispersion (2) may be situated for example in the range from 20 to 75 wt %, preferably 30 to 70 wt %, more preferably 40 to 65 wt %, based in each case on the total weight of the basecoat material for inventive use.

The basecoat material for inventive use comprises at least one color and/or effect pigment (3) in the paint base component (b.1). Such color pigments and effect pigments are known to the skilled person and are described in, for example, Römpp-Lexikon Lacke and Druckfarben, Georg Thieme Verlag, Stuttgart, N.Y., 1998, pages 176 and 451. The terms color pigment and color-imparting pigment are interchangeable, as are the terms effect pigment and effect-imparting pigment.

Preferred effect pigments are, for example, flake-form metallic effect pigments such as leaflike aluminum pigments, gold bronzes, oxidized bronzes and/or iron oxide-aluminum pigments, pearlescent pigments such as pearl essence, basic lead carbonate, bismuth oxychloride and/or metal oxide-mica pigments, and/or other effect pigments such as leaflike graphite, leaflike iron oxide, multilayer pigments composed of PVD films, and/or liquid crystal polymer pigments. Particularly preferred are flake-form metallic effect pigments, especially leaflike aluminum pigments.

Typical color pigments include, in particular, inorganic coloring pigments such as white pigments such as titanium dioxide, zinc white, zinc sulfide, or lithopone; black pigments such as carbon black, iron manganese black, or spinel black; chromatic pigments such as chromium oxide, chromium oxide hydrate green, cobalt green, or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate. Organic pigments as well, though, such as monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments, or aniline black, may be used.

The fraction of the at least one pigment (3) may be situated, for example, in the range from 1 to 25 wt %, preferably 3 to 20 wt %, more preferably 5 to 15 wt %, based in each case on the total weight of the basecoat material for inventive use.

One particularly preferred embodiment of the present invention uses at least one pigment in the form of at least one pigment paste, the paste comprising at least one polyurethane resin (1) as its pasting resin. The pigment is therefore not added directly to the paint base component, being instead used in the form of a pigment paste.

A pigment paste or pigment paste preparation is, as is known, a preparation of pigments or pigment mixtures in carrier materials, in which the pigments generally have a significantly higher concentration than in the subsequent application, in other words, presently, in the basecoat material (b). Serving as carrier materials are usually resins (then referred to as pasting resins) and/or solvents such as organic solvents and/or water. Such pastes are generally used in order to improve the processing properties of the pigments (dust-free processing) and/or to optimize the state of distribution of the pigments within the coating material, by corresponding fine division and wetting of the pigments. Another result of this, of course, is improved optical quality of the multicoat coating produced using the coating material. Specifically through the use of a paste which as well as at least one pigment also includes at least one polyurethane resin (1), these properties are manifested to particular effect.

The preferred pigment pastes contain preferably 1 to 60 wt % of at least one pigment, 10 to 60 wt % of at least one polyurethane resin (1), and 30 to 80 wt % of at least one organic solvent, the stated proportions being based on the total amount of the paste and together making up at least 80 wt %, preferably at least 90 wt %, of the total weight of the paste. The amount of pigments here is guided, for example, by the hiding power or else by the wettability of the pigment. Further components of such a paste may be additives such as wetting agents, for example.

With preference, all the pigments included in the basecoat material (b) are used in the form of such pigment pastes.

The preferred proportional ranges of polyurethane resins (1) and pigments (3) stated earlier on above also, of course, apply when the aforementioned pigment pastes are used.

The basecoat material for inventive use comprises, in the curing component (b.2), at least one hydrophilically modified polyisocyanate (4) having an isocyanate content of 8% to 18%.

The hydrophilically modified polyisocyanates (4) may be prepared by modification of polyisocyanates (4a) known per se to the skilled person, these being organic polyisocyanates (4a). The components in question are the known aliphatic and aromatic components which contain on average more than one isocyanate group per molecule. Use may be made of the polyisocyanates (4a) known per se, such as aliphatic and aromatic polyisocyanates, especially diisocyanates and the dimers and trimers thereof, such as uretdiones and isocyanurates. Examples of polyisocyanates (4a) that can be used include hexamethylene diisocyanate, octamethylene diisocyanate, decamethylene diisocyanate, dodecamethylene diisocyanate, tetramethylene diisocyanate, trimethylhexane diisocyanate, tetramethylhexane diisocyanate, isophorone diisocyanate (IPDI), 2-isocyanatopropylcyclohexyl isocyanate, dicyclohexylmethane 2,4'-diisocyanate, dicyclohexyl-methane 4,4'-diisocyanate, 1,4- or 1,3-bis(isocyanato-methyl)cyclohexane, 1,4- or 1,3- or 1,2-diisocyanato-cyclohexane, and 2,4- or 2,6-diisocyanato-1-methyl-cyclohexane, the dimers and trimers thereof, and also mixtures of these polyisocyanates.

Preferred polyisocyanates (4a) are the known dimers and/or trimers of the aforementioned diisocyanates, in other words, in particular, the uretdiones and isocyanurates, known per se, of the aforementioned diisocyanates. More preferred are isocyanurates, preferably isocyanurates of hexamethylene 1,6-diisocyanate (HDI).

As is known, such isocyanurates can be prepared from a wide variety of isocyanates, in the presence of particular catalysts, examples being sodium formate, potassium acetate, tertiary amines, or triphenyl-phosphines. Formed in this preparation are the highly stable isocyanurate ring systems, which are stable even at high temperatures of more than 100° C., for example, and which are formed of three isocyanate groups in each case. Each of these three isocyanate groups comes from three different molecules of the respective isocyanate used, meaning that trimer structures are formed. Whereas the molecules formed in each case when using monoisocyanates have an unambiguous definition through the respective chemical structural formula, the reaction in the case of polyisocyanates, as for example diisocyanates such as HDI, need not proceed in such a uniform way, and results in particular in more highly crosslinked, so-called isocyanurate polyisocyanates (for example isocyanurate diisocyanates) or mixtures of different isocyanurate polyisocyanates. These, then, are isocyanurates with partially polymeric character, based on a polyisocyanate, such as on a diisocyanate, for example. Depending on the choice of reaction regime and reaction conditions, which are known per se, this means, for example, that further diisocyanates may add to an isocyanurate trimer which has already been formed, and further isocyanurate ring systems may be produced, in which case various products with higher molecular weights are formed. At the same time there is a reduction here in the average number of isocyanate groups, relative to a monomeric diisocyanate. While this number is exactly 1 in the ideal trimer, consisting of precisely three diisocyanate molecules, this number falls to less than 1 in more highly crosslinked isocyanurate polyisocyanates. Another known possibility is that, for example, for adjusting the reactivity of the isocyanurates, fractions of bridging diols, hexanediols for example, may be added during their preparation, and in this way a number of isocyanurate ring systems may be joined to one another.

As is known, the amount of isocyanate groups in polyisocyanates, such as in isocyanurates of diisocyanates, for example, is reported generally by way of the isocyanate content. The isocyanate content is the mass fraction of the free isocyanate groups in polyisocyanates, expressed in percent. For the purposes of the present invention, the isocyanate content is determined according to DIN EN ISO 11909 by reaction of the respective sample with excess dibutylamine and back-titration of the excess with hydrochloric acid against bromophenol blue.

If the starting material used is a particular diisocyanate, HDI for example, and if isocyanurates are then prepared on the basis of this diisocyanate, using the methods known per se and already illustrated above, especially isocyanurates with polymeric character, then the isocyanate content reflects the degree of crosslinking of the respective isocyanurate or isocyanurate diisocyanate. A direct conclusion from the description above is as follows: the lower the isocyanate content, the higher the crosslinking density. Thus, for example, the theoretical isocyanate content of the purely trimeric isocyanurate based on HDI has the maximum value of about 25% (molecular weight 3×NCO=126 g/mol; molecular weight of the purely trimeric isocyanurate of HDI=504.6 g/mol).

The polyisocyanates (4) are hydrophilically modified, thus meaning in particular that they are prepared by hydrophilic modification of polyisocyanates (4a) as described above, preferably isocyanurates of HDI.

This means that the polyisocyanates (4) contain groups which, in comparison to groups and molecular units that are present in common polyisocyanates, such as in the above-described polyisocyanates (4a) more particularly, are more hydrophilic. The groups, consequently, are at any rate more hydrophilic than pure hydrocarbon groups or hydrocarbon fractions. Preferred groups are polyether groups and polyester groups. Preferred polyisocyanates (4) are therefore polyether-modified and/or polyester-modified polyisocyanates. Polyether-modified polyisocyanates are especially preferred.

A polyether-modified polyisocyanate (4) therefore comprises polyether groups such as polyether chains, especially preferably polyoxyalkylene chains. Further-preferred polyether groups are polyoxyethylene, polyoxypropylene and/or mixed polyoxyethylene-polyoxypropylene groups and/or chains. Polyether modification of polyisocyanates or chains. Polyether modification of polyisocyanates refers for the purposes of the present invention in particular to modification with alkoxypolyoxyalkylene groups, preferably methoxy-polyoxyalkylene groups. With very particular preference the groups in question are methoxypolyoxyethylene groups, methoxypolyoxypropylene groups and/or mixed methoxy-polyoxyethylene-polyoxypropylene groups.

To introduce the hydrophilic modifications it is possible, for example, to use the alkoxypoly-(oxyalkylene) alcohols which are known to the skilled person and are also available commercially. In that case there is then a proportional reaction of the isocyanate groups in the polyisocyanate (4a) with the polymeric monoalcohols, as a result of which the polyether modifications—that is, for example, the poly(oxyalkylene) groups—are attached covalently to the polyisocyanate (4a) by formation of urethane bridges, and a hydrophilically modified polyisocyanate (4) is formed.

Similar comments apply in respect of polyester-modified polyisocyanates (4). Preferred are aliphatic, linear polyester groups, especially preferably polylactone groups, more preferably polycaprolactone groups. Polycaprolactones and their preparation, through reaction of a monoalcohol with epsilon-caprolactone, for example, are known. They too can be introduced into a polyisocyanate (4a) by common methods, via reaction of the at least one hydroxyl group they contain with an isocyanate group.

It is evident accordingly that the hydrophilic modification removes isocyanate groups from the system and so leads to a reduction in the isocyanate content relative to the respective polyisocyanate without modification. The reactions underlying the modification, and the reaction conditions to be selected in this context, are known to the skilled person and can be readily adapted according to the case in hand. It is important, however, that the polyisocyanate (4) that is ultimately prepared has the following features: it is a polyisocyanate, meaning that it must have on average more than one isocyanate group per molecule. It must have an isocyanate content of 10% to 18%. It must contain hydrophilic groups, especially poly(oxyalkylene) groups and/or aliphatic, linear polyester groups, with preference among these being given to polyoxyethylene, polyoxypropylene and/or mixed polyoxyethylene-polyoxypropylene groups, and/or polylactone groups.

Subject to these provisos, the fraction of isocyanate groups modified in the polyisocyanate (4) may vary widely and is situated for example in the range of 1-60 mol %, preferably 2-55 mol %, especially preferably 5-50 mol %. The stated molar fraction is based on the free isocyanate groups of the polyisocyanate (4a) before the modification.

The at least one hydrophilically modified polyisocyanate (4) preferably has an isocyanate content of 9% to 16%, more preferably of 10% to 14%.

The fraction of the at least one hydrophilically modified polyisocyanate (4) is preferably 3 to 15 wt %, more particularly 4 to 14 wt %, very preferably 6 to 12 wt %, based in each case on the total amount of the basecoat material for inventive use.

Hydrophilically modified polyisocyanates (4) described are available commercially and can be used as they are in the basecoat material.

In the base component, the basecoat material (b) for inventive use preferably further comprises at least one further specific aqueous dispersion (5).

The aqueous dispersion (5) includes at any rate water and a polyurethane resin fraction, this polyurethane resin fraction consisting of at least one polyurethane resin. The polyurethane resin fraction is of course different from the above-described polyurethane resin (1) and from the polyurethane resin fraction of the dispersion (2).

The polyurethane resin fraction of the dispersion (5) possesses a gel fraction of at least 50%, preferably at least 60%, especially preferably of at least 75%. The dispersion (5) as well, therefore, is a microgel dispersion.

The polyurethane resin fraction preferably consists of exactly one polyurethane resin.

The average particle size (volume average) of the polyurethane resin fraction of the dispersion, dispersed in the form of particles, is preferably from 20 to 500 nanometers, more preferably from 40 to 300 nanometers. This can be measured, in accordance with DIN EN ISO 11357-1, by photon correlation spectroscopy (PCS) by means of a Malvern Nano S90 instrument (from Malvern Instruments) at 25±1° C., and can be evaluated using a digital correlator, with the assistance of the Zetasizer analytical software version 6.32 (from Malvern Instruments), and the measurements can be verified using polystyrene standards having certified particle sizes between 50 to 3000 nm.

It follows from the above that the polyurethane resin fraction preferably possesses a monomodal particle size distribution. Firstly, indeed, the polyurethane resin fraction preferably consists of exactly one polyurethane resin, with exactly one polyurethane resin generally constituting in the form of a monomodal distribution in a dispersion. Secondly, such a monomodal distribution can be described very well via an average particle size.

The polyurethane resin fraction of the dispersion (5) preferably has its glass transition at a temperature of less than 0° C. The glass transition is preferably in the range from −100° C. to −20° C., more preferably −80° C. to −30° C.

Even more preferably the polyurethane resin fraction of the dispersion (5) has no melting transition in the range of less than 100° C. Accordingly, then, in one alternative the polyurethane resin fraction has no melting transition at all, and is therefore purely amorphous in character. Alternatively it possesses (semi)crystalline character, in which case the melting transition is at least 100° C. With preference the polyurethane resin fraction of the dispersion (5) possesses no melting transition at all.

The polyurethane resin fraction of the dispersion (5) as well is preferably not thermochemically curable with components containing isocyanate groups, such as with a hydrophilically modified polyisocyanate (4), for example. Hence it is the case that the hydroxyl number and the amine number of the polyurethane resin fraction of the dispersion (5) are preferably less than 20, especially preferably less than 10.

In the preparation of the polyurethane resins of the dispersion (5) that make up the polyurethane resin fraction, the amounts of the starting products for the preparation are preferably selected such that the ratio of the total molar amount of isocyanate groups to the total molar amount of functional groups which are able to enter into crosslinking reactions with isocyanate groups, more particularly of hydroxyl groups and amino groups, is greater than 0.9. More preferably the stated ratio is greater than 0.95, more particularly at least 1.0, very preferably exactly 1.0.

The polyurethane resin fraction of the dispersion (5) preferably comprises potentially ionic groups, as for example potentially anionic groups, preferably carboxylic or sulfonic acid groups.

The parent polyurethane resins are preferably prepared as follows. In organic solution, (i) a polyurethane prepolymer containing isocyanate groups is prepared, and (ii) this prepolymer is reacted with monocarboxylic acids containing two amino groups, before, during, or after the prepolymer has been dispersed in aqueous phase. In this way, then, the potentially anionic groups are incorporated into the polymer as well. Before, during, or after the dispersing, it is also possible optionally for a reaction to be carried out with further typical diamines, for chain extension. Monocarboxylic acids containing two amino groups and used with preference are N-(2-aminoethyl)-2-amino-ethanecarboxylic acid and N-(2-aminoethyl)-2-amino-ethanesulfonic acid. The dispersions (5) used in the examples were also prepared in this way.

The fraction of the polyurethane resin fraction in the dispersion (5) is preferably 25 to 55 wt %, preferably 30 to 50 wt %, based in each case on the total amount of the dispersion (5).

The fraction of water in the dispersion (5) is preferably 45 to 75 wt %, preferably 50 to 70 wt %, based in each case on the total amount of the dispersion.

The sum of the fraction of the polyurethane resin fraction and of the fraction of water in the dispersion (5) is preferably at least 75 wt %, preferably at least 85 wt %.

Dispersions (5) of this kind as well are available commercially, for example, under the commercial designation Bayhydrol UH (from Bayer), for example.

The fraction of the at least one aqueous dispersion (5) may be situated, for example, in the range from 10 to 40 wt %, preferably 20 to 30 wt %, based in each case on the total weight of the basecoat material for inventive use.

The basecoat material (b) for inventive use is aqueous. The expression "aqueous" is known in this context to the skilled person. It refers fundamentally to a basecoat material which is not based exclusively on organic solvents, in other words does not contain, as solvents, exclusively those on an organic basis, but which instead, on the contrary, includes a significant fraction of water as solvent. Preferred definitions of the term "aqueous" in relation to the basecoat material (b) are given later on below.

It is important, however, that the water is used as a constituent of the paint base component. The reason is that the hydrophilically modified polyisocyanate (4) reacts on contact with water, as already described above. These reactions, however, are to take place only when the two components of the basecoat material are combined and when the thermochemical curing then desired takes place. Accordingly, the curing component (b.2) is preferably water-free or the water is added to the curing component (b.2) only shortly before it is combined with the paint base component (b.1), in other words, in particular, less than 5 minutes before they are combined.

As further constituents it is possible for the basecoat material (b) for inventive use to include any of a very wide variety of coatings components known to the skilled person in the field.

Accordingly, the basecoat material (b) may comprise curable resins other than the polymers already stated, as binders, and can comprise organic solvents, reactive diluents, transparent pigments, fillers, molecularly dispersely soluble dyes, nanoparticles, light stabilizers, antioxidants, deaerating agents, emulsifiers, slip additives, polymerization inhibitors, adhesion promoters, flow control agents, film-forming assistants, thickeners, sag control agents (SCAB), flame retardants, corrosion inhibitors, catalysts, waxes, siccatives, biocides and/or matting agents. The aforementioned enumeration should of course not be taken as exhaustive.

The solids content of the basecoat material (b) may vary according to the requirements of the case in hand. The solids content is guided primarily by the viscosity that is required for application, especially spray application, and so can be adjusted by the skilled worker on the basis of his or her general art knowledge, possibly with the assistance of a few rangefinding tests.

The solids content of the basecoat materials (b) is preferably 15 to 70 wt %, more preferably 17.5 to 60 wt %, and very preferably 20 to 50 wt %.

By solids content (nonvolatile fraction) in the context of the present invention is meant the weight fraction which remains as a residue on evaporation under specified conditions. In the present specification, the solids content is determined according to DIN EN ISO 3251. This is done by evaporating the sample under analysis—the basecoat material, for example—for 60 minutes at 130° C.

Unless indicated otherwise, this test method is likewise employed in order, for example, to specify or predetermine the fraction of various components in a coating composition, such as in the basecoat material (b). A determination is therefore made, for example, of the solids content of a dispersion of a polyurethane resin (1) that is to be added to the basecoat material. By taking account of the solids content of the dispersion with the amount of the dispersion used in the basecoat material, it is then possible to determine or specify the fraction of the component as a proportion of the overall composition.

The term "aqueous basecoat material (b)" should be understood preferably, for the purposes of the present invention, as follows:

The percentage sum of the solids of the basecoat material and the fraction of water in the basecoat material is at least 75 wt %, preferably at least 85 wt %. In this figure, the solids content, which traditionally possesses only the unit "%", is expressed in "wt %". Since the solids content ultimately is a percentage weight figure as well, this form of its representation is justified. Where, for example, a basecoat material has a solids content of 35% and a water content of 50 wt %, the above-defined percentage sum of the solids content of the basecoat material and the fraction of water in the basecoat material amounts to 85 wt %.

This means that preferred basecoat materials for inventive use fundamentally include environmentally burdensome components, such as organic solvents in particular, at a comparatively low fraction of, for example, less than 25 wt %, preferably less than 15 wt %.

THE CLEARCOAT MATERIALS FOR INVENTIVE USE

The clearcoat material (k) for inventive use likewise comprises at least one aqueous dispersion (2) in the paint base component.

All of the features essential to the invention, already specified above, in the aqueous dispersion (2) for use in the basecoat material (b) therefore obviously also apply with respect to the aqueous dispersion (2) for use in the clearcoat material (k). The same applies to the preferred features already indicated above.

The fraction of the at least one aqueous dispersion (2) may be, for example, in the range from 35 to 85 wt %, preferably 45 to 80 wt %, more preferably 55 to 75 wt %, based in each case on the total weight of the clearcoat for inventive use.

The clearcoat (k) for inventive use likewise preferably comprises at least one aqueous dispersion (5) (for definition see above) in the paint base component.

The fraction of the at least one aqueous dispersion (5) may be, for example, in the range from 15 to 45 wt %, preferably 25 to 35 wt %, based in each case on the total weight of the clearcoat for inventive use.

In the curing component (b.2), the clearcoat material for inventive use likewise comprises at least one hydrophilically modified polyisocyanate (4) having an isocyanate content of 8% to 18%.

All of the features essential to the invention, already specified above, in the hydrophilically modified polyisocyanate (4) for use in the basecoat material (b) therefore obviously also apply with respect to the hydrophilically modified polyisocyanate (4) for use in the clearcoat material (k). The same applies to the preferred features already indicated above.

The fraction of the at least one hydrophilically modified polyisocyanate (4) is preferably 3 to 15 wt %, more particularly 4 to 14 wt %, very preferably 6 to 12 wt %, based in each case on the total amount of the clearcoat for inventive use.

With preference the same aqueous dispersion (2) and the same hydrophilically modified polyisocyanate (4) are used in the basecoat material (b) and in the clearcoat material (k).

The clearcoat material (k) for inventive use is aqueous (for definition, see above). Preferred definitions of the term "aqueous" in relation to the clearcoat material (k) are given later on below.

It is important, however, that the water is used as a constituent of the paint base component. The reason is that the hydrophilically modified polyisocyanate (4) reacts on contact with water, as already described above. These reactions, however, are to take place only when the two components of the clearcoat material are combined and when the thermochemical curing then desired takes place. Accordingly, the curing component (k.2) is preferably water-free or the water is added to the curing component (k.2) only shortly before it is combined with the paint base component (k.1), in other words, in particular, less than 5 minutes before they are combined.

As further constituents it is possible for the clearcoat material (k) for inventive use to include any of a very wide variety of coatings components known to the skilled person in the field.

Accordingly, the clearcoat material may comprise curable resins other than the polymers already stated, as binders, and can comprise organic solvents, reactive diluents, transparent pigments, fillers, molecularly dispersely soluble dyes, nanoparticles, light stabilizers, antioxidants, deaerating agents, emulsifiers, slip additives, polymerization inhibitors, adhesion promoters, flow control agents, film-forming assistants, thickeners, sag control agents (SCAB), flame retardants, corrosion inhibitors, catalysts, waxes, siccatives, biocides and/or matting agents. The aforementioned enumeration should of course not be taken as exhaustive.

The solids content of the clearcoat material (k) may vary according to the requirements of the case in hand. The solids content is guided primarily by the viscosity that is required for application, especially spray application, and so can be adjusted by the skilled worker on the basis of his or her general art knowledge, possibly with the assistance of a few rangefinding tests.

The solids content of the clearcoat materials (k) is preferably 15 to 65 wt %, more preferably 17.5 to 55 wt %, and very preferably 20 to 45 wt %.

The term "aqueous clearcoat material (k)" should be understood preferably, for the purposes of the present invention, as follows:

The percentage sum of the solids of the clearcoat material and the fraction of water in the clearcoat material is at least 75 wt %, preferably at least 85 wt % (for elucidation of this figure, see above in the description of the basecoat material (b)).

This means that preferred clearcoat materials for inventive use fundamentally include environmentally burdensome components, such as organic solvents in particular, at a comparatively low fraction of, for example, less than 25 wt %, preferably less than 15 wt %.

The multicoat coatings of the invention on substrates possess a good optical quality, more particularly a high matting effect and, consequently, an optically high-grade and refined appearance. At the same time they exhibit high mechanical resistance and flexibility.

Also provided by the present invention, accordingly, is the use of the multicoat paint systems of the invention for increasing the stability of substrates, especially flexible foam substrates, with respect to external mechanical influences, more particularly the abrasion resistance and stonechip resistance.

The invention is elucidated below with a number of examples.

EXAMPLES

Measurement Methods:
Gel Fraction:

The gel fraction of the polyurethane resin fractions of corresponding aqueous dispersions is determined gravimetrically in the context of the present invention. Here, first of all, the polymer present was isolated from a sample of an aqueous dispersion (initial mass 1.0 g) by freeze-drying. Following determination of the solidification temperature—the temperature above which the electrical resistance of the sample shows no further change when the temperature is lowered further—the fully frozen sample underwent its main drying, customarily in the drying vacuum pressure range between 5 mbar and 0.05 mbar, at a drying temperature lower by 10° C. than the solidification temperature. By graduated increase in the temperature of the heated surfaces beneath the polymer to 25° C., rapid freeze-drying of the polymers was achieved; after a drying time of typically 12 hours, the amount of isolated polymer (solid fraction, determined by the freeze-drying) was constant and no longer underwent any change even on prolonged freeze-drying. Subsequent drying at a temperature of 30° C. of the surface beneath the polymer, with the ambient pressure reduced to the maximum degree (typically between 0.05 and 0.03 mbar), produced optimum drying of the polymer.

The isolated polymer was subsequently sintered in a forced air oven at 130° C. for one minute and thereafter extracted for 24 hours at 25° C. in an excess of tetrahydrofuran (ratio of tetrahydrofuran to solid fraction=300:1). The insoluble fraction of the isolated polymer (gel fraction) was then separated off on a suitable frit, dried in a forced air oven at 50° C. for 4 hours, and subsequently reweighed.

It was further ascertained that at the sintering temperature of 130° C., with variation in the sintering times between one minute and twenty minutes, the gel fraction found for the microgel particles is independent of the sintering time. It can therefore be ruled out that crosslinking reactions subsequent to the isolation of the polymeric solid increased the gel fraction further.

Given that some of the aqueous, commercially acquired polymer dispersions used additionally include inorganic components such as silicates, and the fraction of these inorganic components is of course captured as well in the determination of the gel fraction, all of the dispersions were incinerated (800° C.) and any remaining ash content was then subtracted from the gel fraction found.

Glass Transition and Melting Transition:

The glass transition is determined on the basis of the glass transition temperature. The glass transition temperature in the context of the invention is determined experimentally in a method based on DIN 51005 "Thermal Analysis (TA)—Terms" and DIN 53765 "Thermal Analysis—Differential Scanning calorimetry (DSC)". A sample of the binder is applied with a wet film thickness of 100 µm, using a doctor blade, to a glass plate, dried initially at 40° C. for 1 hour and then dried at 110° C. for 1 hour. For the measurement, a section of the film thus dried is removed from the glass plate and inserted into the measuring sleeve. This sleeve is then inserted into a DSC instrument. It is cooled to the start temperature, after which $1^{st}$ and $2^{nd}$ measurement runs are carried out at a heating rate of 10 K/min with inert gas flushing ($N_2$) of 50 ml/min, with cooling again to the start temperature between the measurement runs.

A glass transition can be seen in the DSC diagram as a section of the measurement curve that in terms of amount possesses a slope much greater in relation to the baselines before and after the transition. The slope greater in terms of amount is known to be attributable to the higher quantity of energy needed in the region of the phase transition in order to increase the temperature. A measurement curve section of this kind then, of course, possesses a point of inflection in the region with the slope that is greater in terms of amount. For the purposes of the present invention, the glass transition temperature of a glass transition is taken to be the temperature of this point of inflection in the $2^{nd}$ measurement run.

The temperature at which the polyurethane resin fraction has its glass transition is defined as follows in the context of the present invention: it is the temperature at the point of inflection of the curve section assignable to the glass transition (glass transition temperature). It is possible for there to be a number of curve sections present to which glass transitions are assigned. The system in question in that case has a number of glass transitions and glass transition temperatures. In such an event, the temperature at which the polyurethane resin fraction has its glass transition is the temperature at the point of inflection of the curve section in the highest temperature range. In such an event, indeed, it is only after the last glass transition that there is no longer any glasslike structure at all in the corresponding polyurethane resin fraction. The expression "its glass transition" can therefore be equated with the wording "its complete glass transition" or "its glass transition with the highest temperature".

The melting transition is likewise determined from the DSC diagram measured as described above. A melting transition is seen as a region which deviates from the baseline in the DSC diagram. Within this region, in fact, the system must be supplied with a greater quantity of energy, owing to the phase conversion of the crystallites, in order to bring about an increase in temperature. These regions, as is known, are seen as peaks with different widths.

The temperature at which the polyurethane resin fraction has its melting transition is defined as follows in the context of the present invention: it is the temperature at the extreme point of the peak assignable to the melting transition. Where there are a number of peaks present to which melting transitions are assignable, the extreme point in question is that of the peak in the highest temperature range. In such an event, indeed, the system has a number of melting transitions. Accordingly, there is no longer any crystalline structure present in the corresponding polyurethane resin fraction only after the last melting transition. The expression "its melting transition" can therefore be equated with the wording "its complete melting transition" or "its melting transition with the highest temperature".

1 Preparation of Basecoat and Clearcoat Materials and Production of Multicoat Coatings The paint base components of different coating materials were acquired directly as commercial product or prepared by successively combining the respective constituents and intimately mixing them in a dissolver (table 1a). Basecoat materials (b) and clearcoat materials (k) for inventive use carry the code I, comparative systems the code C. The curing components of the individual coating materials are listed in table 1b. The figures reported are in each case the parts by weight of the components that were used.

TABLE 1a

Paint base components

| Item | Component | b I1 | k I1 | k C1 | k C2 | k C3 |
|---|---|---|---|---|---|---|
| 1 | Base varnish of a commercial k | — | — | — | 100 | — |
| 2 | Base varnish of a further commercial k | — | — | — | — | 100 |
| 3 | Aqueous dispersion (2) | 53.31 | 72.041 | 72.041 | — | — |
| 4 | First aqueous dispersion (5) | 17.45 | 23.585 | 23.585 | — | — |
| 5 | Second aqueous dispersion (5) | 3.23 | 4.374 | 4.374 | — | — |
| 6 | Pigment paste yellow 1 | 10.31 | — | — | — | — |
| 7 | Pigment paste white 1 | 6.49 | — | — | — | — |
| 8 | Pigment paste yellow 2 | 1.48 | — | — | — | — |
| 9 | Pigment paste black 1 | 0.12 | — | — | — | — |
| 10 | Pigment paste red 1 | 0.11 | — | — | — | — |
| 11 | Water DI | 7.5 | — | — | — | — |

TABLE 1b

Curing components

| Item | Component | b I1 | k I1 | k C1 | k C2 | k C3 |
|---|---|---|---|---|---|---|
| 12 | Polyether-modified HDI isocyanurate (4) having an isocyanate | 8 | 8 | — | — | — |

TABLE 1b-continued

| | | Curing components | | | | |
|---|---|---|---|---|---|---|
| Item | Component | b I1 | k I1 | k C1 | k C2 | k C3 |
| | content of 12%, 70% strength in organic solvents | | | | | |
| 13 | HDI isocyanurate having an isocyanate content of 23% (Desmodur 3600), 56% strength in organic solvents | — | — | 33 | 33 | 33 |

Aqueous dispersion (2): The commercial dispersion comprises a polyurethane resin fraction with a gel fraction of 61.3%. The polyurethane resin fraction has its glass transition at a temperature of −47° C. and its melting transition at a temperature of 50° C. The polyurethane fraction comprises particles having a particle size of 1 to 100 micrometers. The solids content of the dispersion is 26.5% including 1.8% of inorganic components (silicates) (determined via incineration, 800° C.)

Aqueous dispersions (5): The commercial dispersions comprise a polyurethane resin fraction having a gel fraction of 91% (first dispersion) or 95% (second dispersion). The average particle size (volume average) is 244 nanometers (first dispersion) or 56 nanometers (second dispersion). The polyurethane resin fractions have their glass transition at −48° C. (first dispersion) or −60° C. (second dispersion). Melting transitions at below 100° C. are not observed. The solids contents of the dispersions are 39.0% (first dispersion) and 37.0% (second dispersion).

Pigment pastes: The pigment pastes each comprise a polyurethane resin (1) as pasting resin. The polyurethane resins used possess a hydroxyl number in the range between 20 and 40 mg KOH/g and an acid number in the range from 20 to 30 mg KOH/g. The fraction of the resins in the pastes is in the range from 10 to 30 wt %. Pigments included are commercial color pigments (fraction in the range from 5 to 60 wt %, according to type of pigment in each case). Likewise included are organic solvents (fraction in the range from 30 to 80 wt %).

Subsequently, using the basecoat and clearcoat materials, multicoat coatings were produced on foam substrates. In this case the respective paint base component was not mixed homogeneously with the curing component until immediately prior to application. Application was made in a two-coat system (pneumatic manual coating), first basecoat then clearcoat. To start with the basecoat material was applied directly to the substrate, flashed at 25° C. for 10 minutes, and then the clearcoat material was applied directly to the basecoat and the multicoat coating was then cured in a forced air oven at 80° C. for 30 minutes. The film thicknesses (cured) are in each case 20-25 μm for both basecoat and clearcoat. Substrates used were thermoplastic polyurethane bead foams in the form of sheets with a thickness of about 1 cm. The polyurethane bead foams were produced beforehand by expanding and fusing corresponding polyurethane pellets in corresponding molds by means of steam.

The following multicoat coatings (M) were produced (table 2):

TABLE 2

| | Multicoat coatings | | | |
|---|---|---|---|---|
| Multicoat coating System | MI1 | MC1 | MC2 | MC3 |
| | b I1 | b I1 | b I1 | b I1 |
| | k I1 | k C1 | k C2 | k C3 |

2 Investigations on the Multicoat Coatings

Investigations were carried out into the flexibility and elasticity and also the stonechip resistance of the multicoat coatings disposed on the film substrates. Tests conducted were as follows:
  (a) The coated substrate was bent over the edge of a steel panel 2 mm thick. A determination was made of the bending angle at which cracking/"breaking" was seen in the coating system.
  (b) The coated substrate was folded (180° bend) centrally with the coated side outward, and was grasped at both ends. The loading trial was carried out by moving the hands in opposite directions ("twisting" movement). The coated substrates were subsequently inspected.
  (c) The coated substrate was tested for its impact capacity using a 5 euro cent coin. This was done by placing the coin upright on the film surface by its edge and pressing it into the substrate at constant pressure. The maximum depth of impression was 5 mm.
  (d) Stonechip test according to DIN EN ISO 20567-1.

Results found were as follows:

The inventive multicoat coating MI1 showed no cracking/damage at all at a maximum possible bend of 180° over the metal edge (test (a)). Nor was it possible to determine the changes after bending with the coated side outward (180°). The twisting movement as well showed no effect at all on the appearance of the coating (test (b)). In the case of the 5 euro cent impact test, coating system MI1 likewise showed no damage at all to the surface (test (c)). No damage at all was found in the stonechip test.

In the case of the variants MC2 and also MC3, breaking/cracking of the coating system was observed/heard after 45° and 30° bending, respectively, in test (a). Furthermore, the unprotected substrate was visible. During the 180° folding (b), moreover, the samples undergo defined breaking along the bending edge; as a result of the twisting movement, the coating system tears and breaks without coordination in all directions. In test (c), the coatings broke with an audible crack at a depth of penetration of 2 mm. In both systems, the stonechip test led to a large number of cracks in the coating, which were readily visible using commercial magnifying glasses.

The flexibility characteristics of system MC1 were similar to those of inventive example MI1. After a 180° bend (film surface on the inside), however, about the metal edge, creasing was found along the bending edge, and was still visible even after the substrate had been removed from tension (significantly delayed fold reformation). The stonechip test did not lead to any damage at all.

The investigations show that the inventive multicoat coatings have advantages in terms of elasticity, flexibility, and stonechip resistance.

3 Production of Further Coatings and Investigation of these Coatings

As described above, further coatings MI1 were produced. In addition, coatings were produced for which no clearcoat material was applied. The coatings therefore contain only one film of the basecoat material b I1, disposed directly on the foam substrate.

Investigations were carried out into chemical resistances and abrasion resistance:
(a) For the determination of the chemical resistances, the procedure of DIN EN ISO 2812-3 was carried out, using a pad. The evaluation scale runs from 0 (no traces) to 5 (detachment).
(b) The abrasion resistance of the coated surfaces was conducted according to GS97034-5 (BMW) using a crockmeter (method B, in accordance with DIN EN ISO 105-X12) (10 double rubs, using cotton rub fabrics wetted with different media). The samples are inspected both for visible traces of abrasion on the coated substrate and for perceptible color rub-off on the cotton rubbing fabrics used. The evaluation scale runs from 0 (complete abrasion) to 5 (no abrasion at all).

Tables 3 and 4 show the results.

TABLE 3

| | Chemical resistance | | | |
|---|---|---|---|---|
| Sample | Ethanol | Methyl ethyl ketone | Acetone | Ethyl acetate |
| B I1 | 0 | 2 | 1 | 1 |
| MI1 | 0 | 1 | 0 | 0 |

In these investigations it is apparent that the two-coat system (pigmented basecoat plus clearcoat, MI1) exhibits better resistance overall with respect to chemicals/solvents in relation to the one-coat system (pigmented basecoat material only).

TABLE 4

| | Abrasion resistance | | | | | |
|---|---|---|---|---|---|---|
| | Water | | Cockpit spray | | Ethanol | |
| Sample | Substrate | Rub fabric | Substrate | Rub fabric | Substrate | Rub fabric |
| B I1 | 5 | 5 | 5 | 4-5 | 5 | 4 |
| MI1 | 5 | 5 | 5 | 5 | 5 | 5 |

The two-coat system (pigmented basecoat plus clearcoat, MI1) shows better resistance in its abrasion behavior than the one-coat system (pigmented basecoat material only).

4 Further Multicoat Coatings and their Investigation

In analogy to the production process identified above, further comparative multicoat coatings were produced and compared with multicoat coatings MI1. Tables 5a and b and also 6 show all of the coating materials used (and/or the paint base components, tables 5a and b) and the multicoat coatings produced (table 6).

TABLE 5a

| | Paint base components | | | | | |
|---|---|---|---|---|---|---|
| Item | Component | b I1 | b C1 | b C2 | k I1 | k C4 | k C5 |
| 1 | Aqueous dispersion (2) (see table 1a) | 53.31 | — | — | 72.041 | — | — |
| 2 | Further aqueous dispersion (5)[1] | — | 42.73 | — | — | 67.4 | — |
| 3 | Aqueous dispersion used for comparison, containing polyurethane[2] | — | — | 42.73 | — | — | 67.4 |

TABLE 5a-continued

| | Paint base components | | | | | |
|---|---|---|---|---|---|---|
| Item | Component | b I1 | b C1 | b C2 | k I1 | k C4 | k C5 |
| 4 | First aqueous dispersion (5) (see table 1a) | 17.45 | 17.45 | 17.45 | 23.585 | 27.5 | 27.5 |
| 5 | Second aqueous dispersion (5) (see table 1a) | 3.23 | 3.23 | 3.23 | 4.374 | 5.1 | 5.1 |
| 6 | Pigment paste yellow 1 (table 1a) | 10.31 | 10.31 | 10.31 | — | — | — |
| 7 | Pigment paste white 1 (table 1a) | 6.49 | 6.49 | 6.49 | — | — | — |
| 8 | Pigment paste yellow 2 (table 1a) | 1.48 | 1.48 | 1.48 | — | — | — |
| 9 | Pigment paste black 1 (table 1a) | 0.12 | 0.12 | 0.12 | — | — | — |
| 10 | Pigment paste red 1 (table 1a) | 0.11 | 0.11 | 0.11 | — | — | — |
| 11 | Water DI | 7.5 | 3.9 | 3.9 | — | — | — |

[1]This dispersion (5) has a solids content of 35%. The polyurethane fraction has a gel fraction of 60% and has its glass transition at a temperature of −45° C. Melt transitions at less than 100° C., however, are not present. The average particle size (volume average) is 43 nanometers.
[2]The dispersion has a solids content of 35%. The polyurethane resin fraction has a gel fraction of only 1% and has its glass transition at a temperature of −42° C. Melting transitions at less than 100° C. are not present.

TABLE 5b

| | Curing components | | | | | |
|---|---|---|---|---|---|---|
| Item | Component | b I1 | b C1 | b C2 | k I1 | k C4 | k C5 |
| 12 | Polyether-modified HDI isocyanurate having an isocyanate content of 12%, 70% strength in organic solvents | 8 | 8 | 8 | 8 | 8 | 8 |

TABLE 6

| Multicoat coatings | | | |
|---|---|---|---|
| Multicoat coating System | MI1 b I1 k I1 | MC4 b C1 k C4 | MC5 b C2 k C5 |

Investigations were made of the gloss (using a BYK micro-TRI-gloss meter, 20°) and also of the flexibility and elasticity (by means of the methods (a) to (c) described in section 2).

Table 7 shows the corresponding results of gloss measurement. Low values correspond to low gloss.

TABLE 7

| Gloss measurement | | | |
|---|---|---|---|
| Multicoat coating | MI1 | MC4 | MC5 |
| Gloss (20°) | 1.1 | 28 | 55 |

The inventive multicoat coating MI1 possesses an extremely low gloss/high matting effect and has an optically high-grade and refined appearance in comparison to the comparative systems.

The investigation of flexibility and elasticity found that the multicoat coatings MC4 and MC5, while they did not suffer cracking, nevertheless showed greatly increased fold formation after bending and twisting movements, in comparison to MI1. Fold reformation was significantly delayed. Overall, the flexibility and elasticity of the comparative systems are much poorer than in the case of system MI1.

The invention claimed is:

1. A method for producing a multicoat coating (M) on a substrate (S), the method comprising:
   (I) applying an aqueous basecoat material (b) to the substrate (S) to obtain a basecoat (B) on the substrate (S), the aqueous basecoat material (b) being a two-component coating composition comprising
   (b.1) a base component comprising
      (1) at least one polyurethane resin (1) having a hydroxyl number of 15 to 100 mg KOH/g and an acid number of 10 to 50 mg KOH/g,
      (2) at least one aqueous dispersion comprising water and a polyurethane resin fraction consisting of at least one polyurethane resin, the polyurethane resin fraction having a gel fraction of at least 50%, having a glass transition at a temperature of less than −20° C. and having a melting transition at a temperature of less than 100° C.,
      (3) at least one color pigment, effect pigment, or both, and
   (b.2) a curing component comprising
      (4) at least one hydrophilically modified polyisocyanate (4) having an isocyanate content of 8% to 18%; and
   (II) applying an aqueous clearcoat material (k) directly to the basecoat (B) to obtain a clearcoat (K) directly on the basecoat (B), the aqueous clearcoat material (k) being a two-component coating composition comprising
   (k.1) a paint base component comprising
      (2) at least one aqueous dispersion comprising water and a polyurethane resin fraction consisting of at least one polyurethane resin, the polyurethane resin fraction having a gel fraction of at least 50%, having a glass transition at a temperature of less than −20° C. and having a melting transition at a temperature of less than 100° C., and
   (k.2) a curing component comprising
      (4) at least one hydrophilically modified polyisocyanate (4) having an isocyanate content of 8% to 18%.

2. The method as claimed in claim 1, wherein the at least one hydrophilically modified polyisocyanate (4) is selected from the group consisting of a polyether-modified polyisocyanate, a polyester-modified polyisocyanate, and mixtures thereof.

3. The method as claimed in claim 2, wherein the at least one hydrophilically modified polyisocyanate (4) is selected from the group consisting of a polyoxyethylene-modified polyisocyanate, a polyoxypropylene-modified polyisocyanate, a mixed polyoxyethylene-polyoxypropylene-modified polyisocyanate, and mixtures thereof.

4. The method as claimed in claim 3, wherein the polyoxyethylene-modified polyisocyanate, the polyoxypropylene-modified polyisocyanate, the mixed polyoxyethylene-polyoxypropylene-modified polyisocyanate, and the mixtures thereof are modified isocyanurates.

5. The method as claimed in claim 1, wherein the at least one polyurethane resin (1), based on a total amount of starting compounds in preparing the polyurethane resin (1), is prepared from between 30 and 80 wt % of at least one polyester diol prepared from at least one dimer fatty acid.

6. The method as claimed in claim 5, wherein, in preparing the at least one polyester diol, at least 50 wt % of dicarboxylic acids are the at least one dimer fatty acid.

7. The method as claimed in claim 1, wherein at least one color pigment (3) and the at least one polyurethane resin (1) in the base component (b.1) are comprised in a pigment paste.

8. The method as claimed in claim 7, wherein the pigment paste comprises:
   1 to 60 wt % based on a total amount of the pigment paste of the at least one color pigment (3),
   10 to 60 wt % based on a total amount of the pigment paste of the at least one polyurethane resin (1), and
   30 to 80 wt % based on a total amount of the pigment paste of at least one organic solvent,
wherein the at least one color pigment (3), the at least one polyurethane resin (1) and the at least one organic solvent comprise at least 80 wt % of a total weight of the paste.

9. The method as claimed in claim 1, wherein the polyurethane resin fraction of the at least one aqueous dispersion (2) has a glass transition at a temperature ranging from −100° C. to less than −20° C., has a melting transition at a temperature ranging from −20° C. to less than 90° C., and comprises particles having a particle size of greater than 1 micrometer.

10. The method as claimed in claim 1, wherein the aqueous basecoat material (b) and the aqueous clearcoat material (k) further comprise at least one further aqueous dispersion (5), a polyurethane resin fraction of the further aqueous dispersion (5) having a gel fraction of at least 50% and being present in the form of dispersed particles having a volume average particle size of 20 to 500 nanometers.

11. The method as claimed in claim 1, wherein the substrate (S) comprises a flexible foam substrate.

12. The method as claimed claim 1, wherein the basecoat (B) is produced directly on the substrate (S).

13. The method as claimed in claim 1, wherein the basecoat (B) and the clearcoat (K) are cured jointly at temperatures between 40 and 120° C., and no further coat is produced.

14. A multicoat coating produced by the method of claim 1.

15. A method for increasing stability of a substrate to external mechanical influences, the method comprising coating the substrate with the multicoat coating of claim 14.

* * * * *

UNITED STATES PATENT AND TRADEMARK OFFICE
CERTIFICATE OF CORRECTION

PATENT NO.         : 10,329,450 B2                                  Page 1 of 1
APPLICATION NO.    : 15/575478
DATED              : June 25, 2019
INVENTOR(S)        : Jens-Henning Noatschk et al.

It is certified that error appears in the above-identified patent and that said Letters Patent is hereby corrected as shown below:

On the Title Page

Column 2, Line 33, "WO 2008/11375" should read --WO 2008/113755--.

In the Specification

Column 12, Line 18, "tricyclodecanedicar-boxylic" should read --tricyclodecanedicarboxylic.--.

Column 22, Line 63, "at at" should read --at--.

Column 24, Line 19, "(SCAB)" should read --(SCAs)--.

Signed and Sealed this
Twenty-eighth Day of January, 2020

Andrei Iancu
*Director of the United States Patent and Trademark Office*